(12) United States Patent
Crespo Peña et al.

(10) Patent No.: US 10,745,105 B2
(45) Date of Patent: Aug. 18, 2020

(54) THERMOPLASTIC MOULDED INJECTED TIP STRUCTURE FOR AN AIRCRAFT

(71) Applicant: Airbus Operations, S.L., Getafe (ES)

(72) Inventors: Soledad Crespo Peña, Madrid (ES); Francisco Javier Honorato Ruiz, Madrid (ES); Iker Vélez De Mendizabal Alonso, Madrid (ES); Carlos García Nieto, Madrid (ES); Enrique Guinaldo Fernández, Madrid (ES); Álvaro Torres Salas, Madrid (ES); Pablo Cebolla Garrofe, Madrid (ES); Álvaro Calero Casanova, Madrid (ES)

(73) Assignee: Airbus Operations, S.L. (ES)

( * ) Notice: Subject to any disclaimer, the term of this patent is extended or adjusted under 35 U.S.C. 154(b) by 364 days.

(21) Appl. No.: 15/645,332

(22) Filed: Jul. 10, 2017

(65) Prior Publication Data
US 2018/0022438 A1    Jan. 25, 2018

(30) Foreign Application Priority Data

Jul. 20, 2016   (EP) .................................... 16382351

(51) Int. Cl.
*B64C 3/24*     (2006.01)
*B64C 3/00*     (2006.01)
*B64D 37/32*    (2006.01)
*B29C 45/00*    (2006.01)
(Continued)

(52) U.S. Cl.
CPC ............ *B64C 3/24* (2013.01); *B29C 45/0001* (2013.01); *B29C 45/0005* (2013.01);
(Continued)

(58) Field of Classification Search
CPC .... B64C 3/24; B64C 3/00; B64C 3/58; B64C 3/18; B64D 37/32; B29C 45/0005;
(Continued)

(56) References Cited

U.S. PATENT DOCUMENTS 4,012,549 A * 3/1977 Slysh ........................ B64C 1/08
                                                428/116
5,688,426 A * 11/1997 Kirkwood ............... B64C 1/064
                                                219/633
(Continued)

FOREIGN PATENT DOCUMENTS

EP          0948085 A2    10/1999
EP        2 990 188 A2     3/2016
(Continued)

OTHER PUBLICATIONS

EP 16382351.1 Search Report dated Jan. 19, 2017.

*Primary Examiner* — Assres H Woldemaryam
(74) *Attorney, Agent, or Firm* — Lerner, David, Littenberg, Krumholz & Mentlik, LLP

(57) ABSTRACT

A tip structure for an aircraft airfoil, such as a control surface (ailerons, flaps, elevators, rudders, etc) and/or a lifting surface (wings, HTP's, VTP's) is a unitary body and includes a tip shell and a metallic material on the outer surface of the tip shell suitable to withstand a lighting strike. The tip shell has been obtained by a single-stage injection molding process using a thermoplastic composite material having fibers dispersed therein, and the metallic material has been integrally formed with the tip shell.

10 Claims, 5 Drawing Sheets

(51) Int. Cl.
*B29D 99/00* (2010.01)
*B64C 3/18* (2006.01)
*B64C 3/58* (2006.01)
*B29K 71/00* (2006.01)
*B29K 81/00* (2006.01)
*B29K 307/04* (2006.01)
*B29K 309/08* (2006.01)
*B29L 31/30* (2006.01)

(52) U.S. Cl.
CPC ............ *B29D 99/0014* (2013.01); *B64C 3/00* (2013.01); *B64C 3/18* (2013.01); *B64C 3/58* (2013.01); *B64D 37/32* (2013.01); *B29K 2071/00* (2013.01); *B29K 2081/04* (2013.01); *B29K 2307/04* (2013.01); *B29K 2309/08* (2013.01); *B29L 2031/3085* (2013.01); *Y02T 50/44* (2013.01)

(58) Field of Classification Search
CPC . B29C 45/0001; B29D 99/0014; Y02T 50/44; B29L 2031/3085; B29K 2071/00; B29K 2307/04; B29K 2081/04; B29K 2309/08
See application file for complete search history.

(56) References Cited

U.S. PATENT DOCUMENTS

| | | | |
|---|---|---|---|
| 2005/0236524 | A1 | 10/2005 | Sarh |
| 2009/0277996 | A1* | 11/2009 | Rinaldi ............... B64C 3/28 244/123.1 |
| 2011/0247203 | A1* | 10/2011 | Lopez-Reina Torrijos ................ B64D 37/32 29/729 |
| 2013/0115404 | A1* | 5/2013 | Goehlich ............... B29C 65/00 428/45 |
| 2015/0064409 | A1* | 3/2015 | Takeuchi ............... B32B 15/08 428/164 |
| 2015/0343702 | A1* | 12/2015 | Garcia Martin et al. ................... B29D 99/0014 244/123.1 |

FOREIGN PATENT DOCUMENTS

| | | | |
|---|---|---|---|
| WO | 2008/121005 A1 | 10/2008 | |
| WO | WO-2008121005 A1 * | 10/2008 | ............... B64C 1/06 |
| WO | 2013/103436 A2 | 7/2013 | |

\* cited by examiner

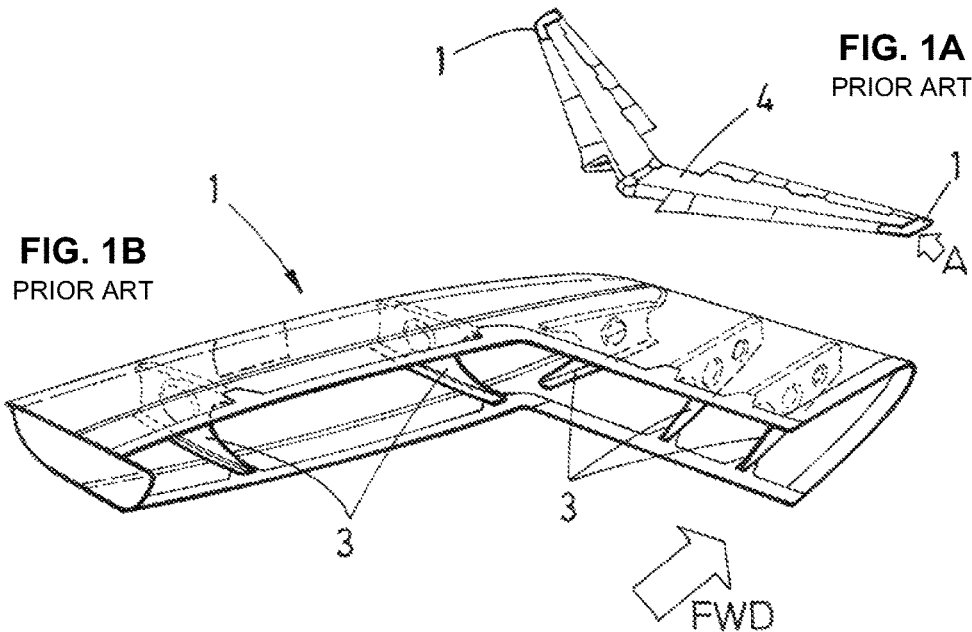
FIG. 1A PRIOR ART
FIG. 1B PRIOR ART
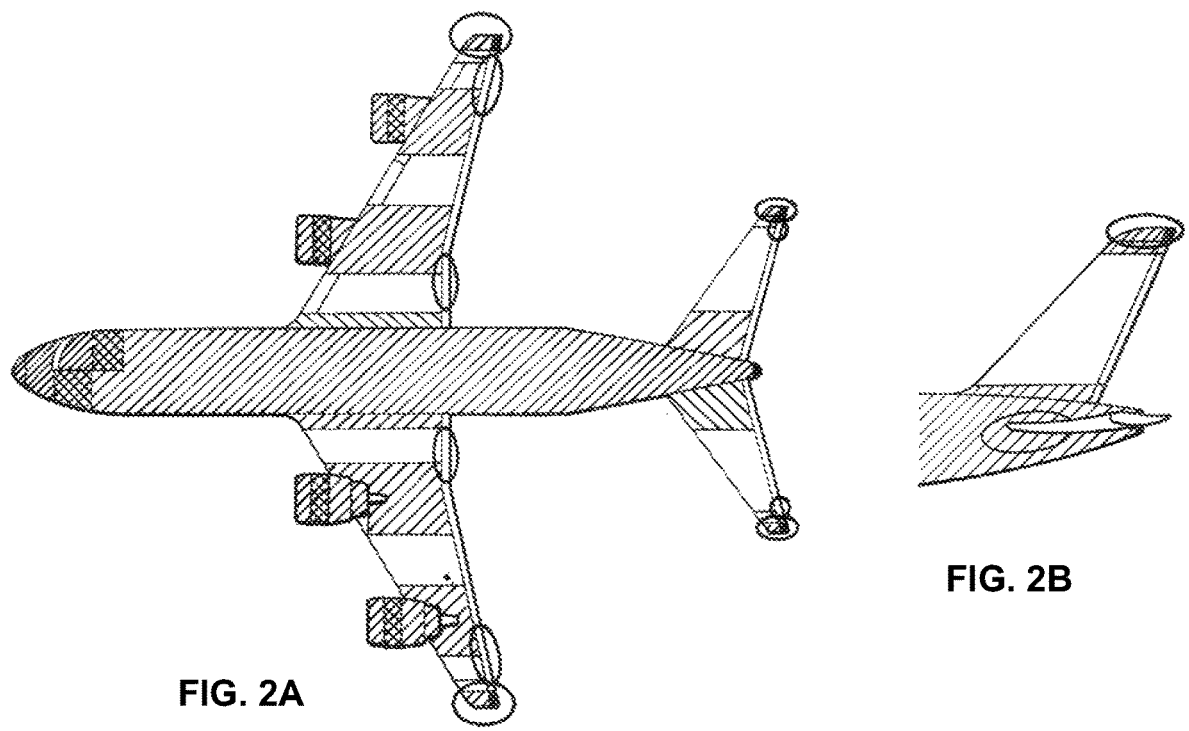
FIG. 2A
FIG. 2B

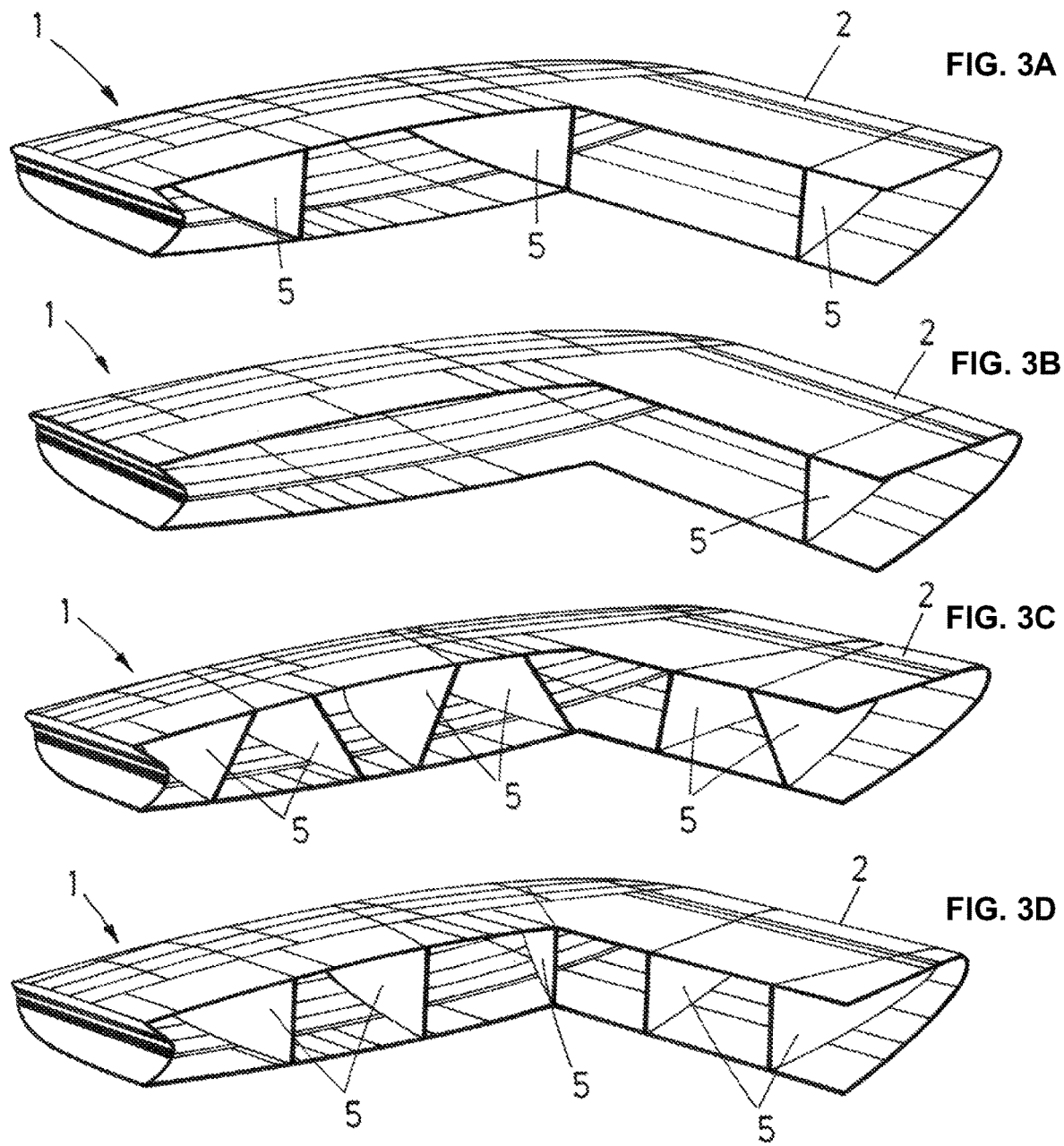

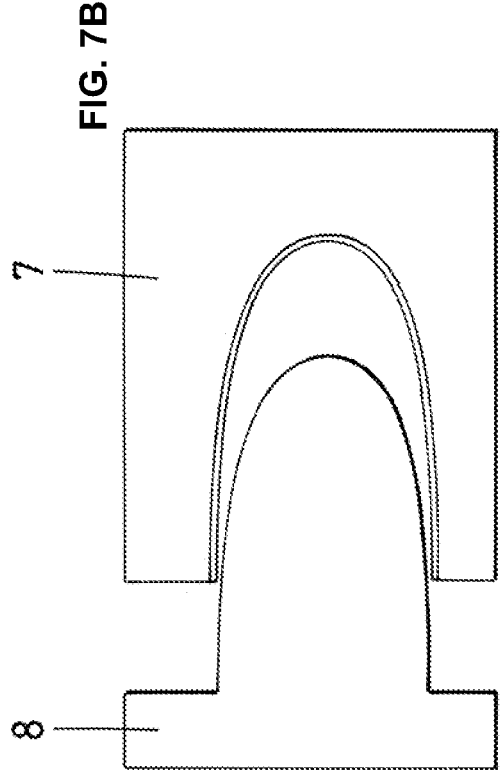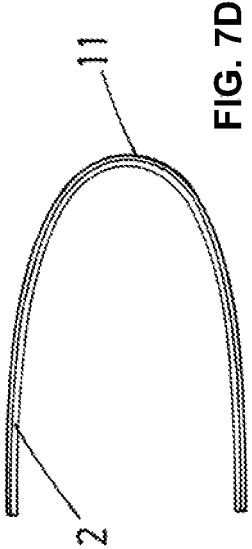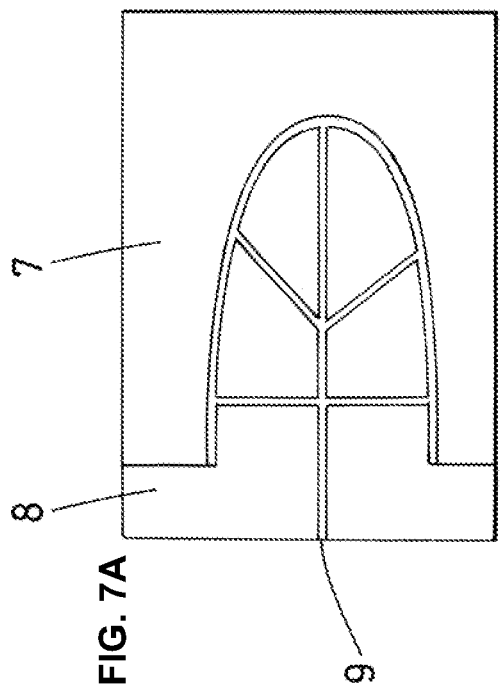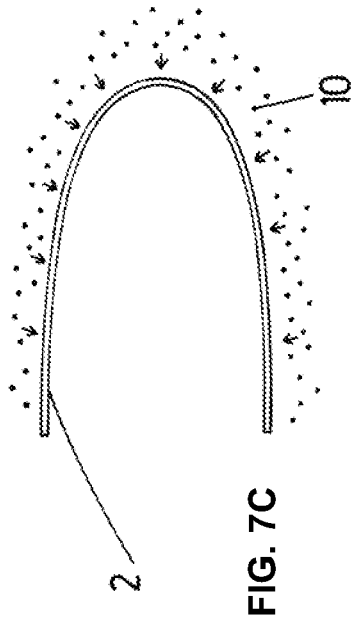

THERMOPLASTIC MOULDED INJECTED TIP STRUCTURE FOR AN AIRCRAFT

FIELD OF THE INVENTION

The present invention refers in general to the configuration of a tip structure for an aircraft airfoil, such as a control surface (ailerons, flaps, elevators, rudders, etc) and/or a lifting surface (wings, HTP's, VTP's).

An aspect of the invention may provide a tip configuration that can be manufactured in one-shot process, achieving thereby high production rates and reducing manufacturing costs.

BACKGROUND OF THE INVENTION

The tips of an aircraft airfoil, for example of a Horizontal Tail Plane (HTP), are the outer fairings at both sides, that is, the components of the HTP which is the furthest from the fuselage. FIG. 1A shows the location of the tips at an HTP, wherein it can be noted that the tips (1) complete the aerodynamic shape of the HTP leading edge.

Conventionally, tips are obtained from an aluminium alloy and are formed by several skin (2) components conformed and welded, which are internally reinforced by a structure (3) formed by metallic ribs and/or spars depending of the aircraft size, to which the tip fairing is riveted and/or welded. FIG. 1B is an example of a conventional tip structure.

The tips (1) are commonly interchangeable due to the fact that they are parts prone to accidental damage, collisions, etc.

Tips for large aircrafts have complex multi-rib structures, which can be obtained from composite materials, like Carbon Fiber Reinforced Plastic (CFRP), typically by a Resin Transfer Molding (RTM) process.

Since the tips are not Primary Structural Elements, they are generally regarded as secondary structures, and among others, must satisfy the following sizing criteria and operative requirements:
1. Stability analysis at critical aerodynamic pressure load case
2. Static strength analysis at critical loads
3. No detrimental deformation for cruise Load Case
4. Lightning strike requirements
5. Ice impact and small debris impact requirements
7. Erosion resistance requirements for the erosion prone areas of the tip
8. Interfaces analyses with torsion box, leading edge, elevator etc.

Therefore, prior art tip configurations are complex in that they are formed by several components that need to be produced separately and then assembled together, so that such as the associated manufacturing methods are time-consuming and consequently slow and expensive. Additionally, the use of metallic materials implies a significant weight penalty.

On the other hand, isogrid patterns are well-known structures that are characterized by their low weight and high rigidity. Isogrid structures are typically formed from a plate or face sheet reinforced with a framework of stringers or stiffeners interconnected at their ends, and conforming equal equilateral triangular openings. These triangular patterns are very efficient, because they provide stiffness but at the same time save material and therefore weight. The term isogrid is used because the structure acts like an isotropic material, with equal properties measured in any direction.

Patents U.S. Pat. No. 4,012,549 A, EP-0948085 (A2) describe examples of isogrid structures.

BRIEF SUMMARY OF THE INVENTION

An aspect of the present invention refers to the configuration of a tip structure for an aircraft, and may satisfactorily overcome the above-mentioned drawbacks of the prior art, by providing a tip configuration that can be manufactured in one-shot (only one manufacturing stage) using a proper strength-to-weight material.

An aspect of the invention refers to a tip structure for an aircraft. The tip structure is a thermoplastic continuous single structure, which will be understood as a unitary body, comprising an interface area configured to be attached to a torsion box, and conductive material suitable to withstand a lighting strike event. Preferably, the tip structure has been manufactured either by a single-stage injection process, or in the case of large structures, the tip structure is formed by two or more parts, each part obtained by an injection process, with then the parts are attached to each other by melting.

The tip structure comprises a tip shell or fairing that is obtained by injection molding process using a thermoplastic composite material having fibers, particles and/or nano-reinforcements dispersed therein.

Additionally, a metallic material suitable to withstand lighting strike events, that is to provide electrical conductivity without compromising the integrity of the structure, is applied on the outer surface of the tip shell, in such a manner that the metallic material is integrally formed with the tip shell, which means that the metallic material get fixed (without fastening means) with the tip shell as consequence of the manufacturing process.

Preferably, the tip structure further comprises a reinforcing structure internally arranged inside the tip shell, and formed by ribs, stiffeners and/or spars. The reinforcing structure is obtained during the same injection molding process; that is, at the same time that the tip shell and using the same composite material. Therefore, it could be said that the reinforcing structure and the tip shell are a unitary body because they are integrally formed.

Another aspect of the invention, refers to a method for manufacturing a tip structure for an aircraft comprising the steps of injecting into a mold a thermoplastic composite material having fibers, particles or nano-reinforcements dispersed therein, to obtain a molded tip shell, and preferably also a reinforcing structure inside the tip shell, such as both the tip shell and the reinforcing structure are integrally formed in one-shot injection molding process using the same material.

As per the metallic material, this can be integrated with the tip shell while this is injected into a mold, or alternatively the metallic material is formed integrally with the tip shell by any known metal deposition process.

Some of the advantages of an embodiment of the invention can be summarized as follows:
- allows high productivity rates by means of plastic injection manufacturing techniques, achieving thereby significant cost savings.
- eliminates the production and later assembly of individual metallic components, saving weight and cost.
- provides a simple approach for the connection of the tip to a torsion box with no penalties in terms of weight.
- fulfils all structural, operational and aerodynamic requirements.

BRIEF DESCRIPTION OF THE DRAWINGS

Preferred embodiments of the invention are henceforth described with reference to the accompanying drawings, wherein:

FIG. 1A shows a perspective view of a generic HTP of the prior-art, and FIG. 1B shows a perspective view of a tip structure of the prior art.

FIG. 2A shows a top plan view of a conventional aircraft, and FIG. 2B shows a lateral view of an aircraft rear section. The potential application areas of the invention appear encircled.

FIGS. 3A-3D show in perspective view, several embodiments of tip structures according to the invention.

FIGS. 7A-7D illustrate an alternative manufacturing method of the invention, wherein the metallic material is applied by a surface metallization process.

DETAILED DESCRIPTION

FIG. 3 shows several embodiments of tip structures according to the invention. Each tip structure (1) comprises a tip shell (2) and a reinforcing structure (3) internally fitted inside the tip shell (2) to reinforce the same. The reinforcing structure (3) comprises ribs (5) in different number and arrangements as shown in drawings (A-D), additionally it comprises spars and/or stringers but all of them obtained in one-shot thermoplastic injection molding process.

The tip shell (2) and the ribs (5) are made from a thermoplastic composite material reinforced with short fibers, either carbon or glass fibers, dispersed in the material, and are obtained preferably by a single-stage injection molding process.

Preferably, the thermoplastic composite material comprises Polyaryl Ether Ketone (PAEK), or Polyether Ether Ketone (PEEK). Preferably, the thermoplastic composite material comprises up to about 40% of weight of carbon fibers or glass fibers. PAEK and PEEK materials provide mechanical, wear and chemical resistance properties, whereas the content of short fibers enhances the mechanical behavior, whereas at the same time allow the manufacture of the component by injection molding.

Figure 5:
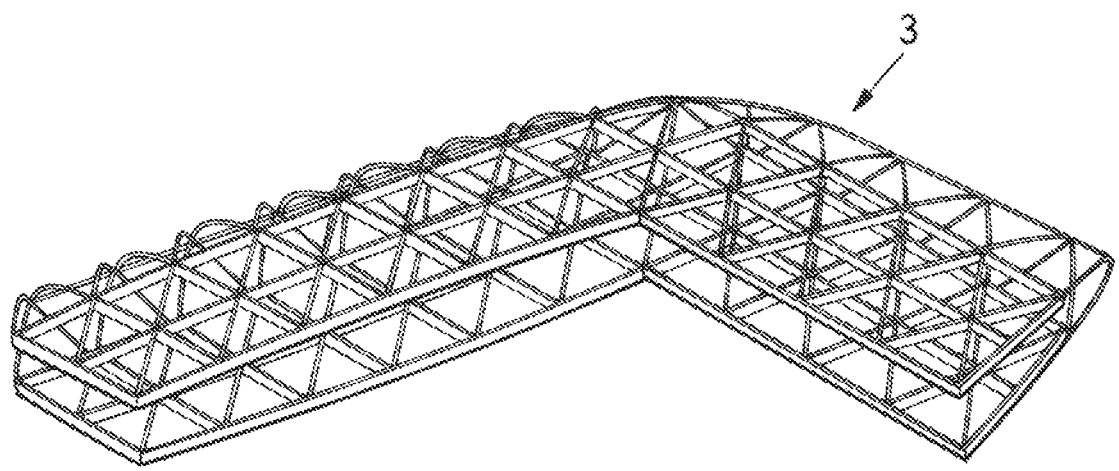
FIG. 5 shows a in a perspective view an exemplary embodiment of a reinforcing structure configured as an isogrid pattern.
Figure 6A:
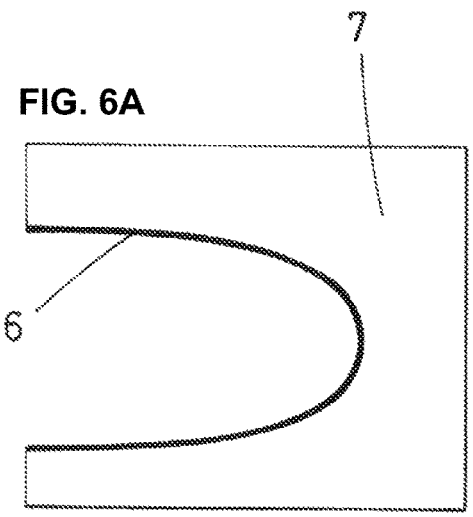
FIGS. 6A-6E illustrate a preferred example of the manufacturing method of the invention, wherein the thermoplastic is injected one a metallic mesh placed inside a mold.
Figure 6B:
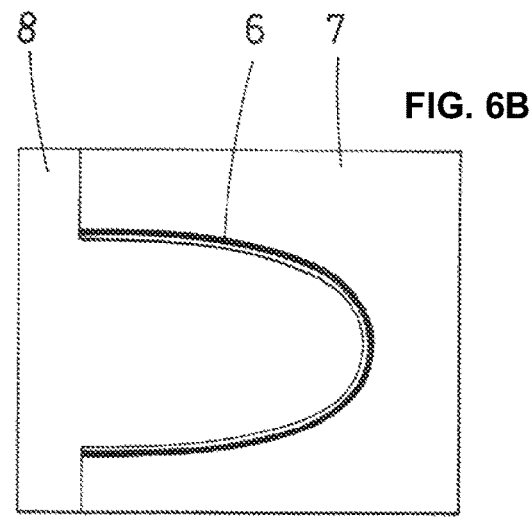
Figure 6C:
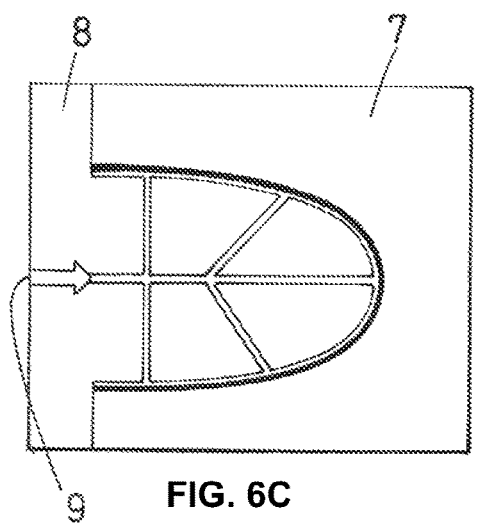
Figure 6D:
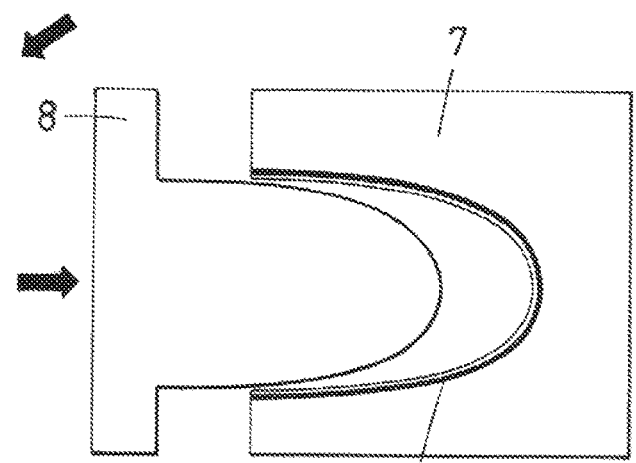
Figure 6E:
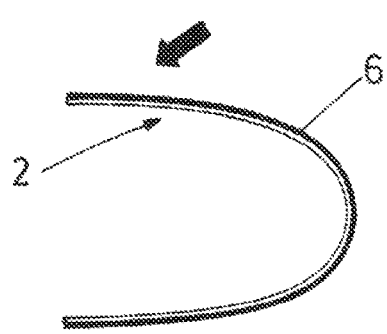

Injection molding processes allow the production of components with very complex and integrated shapes. In this way, as shown in the preferred embodiment of FIG. 5, the reinforcing structure (3) is configured as an isogrid pattern designed for each particular application.

Figure 4:
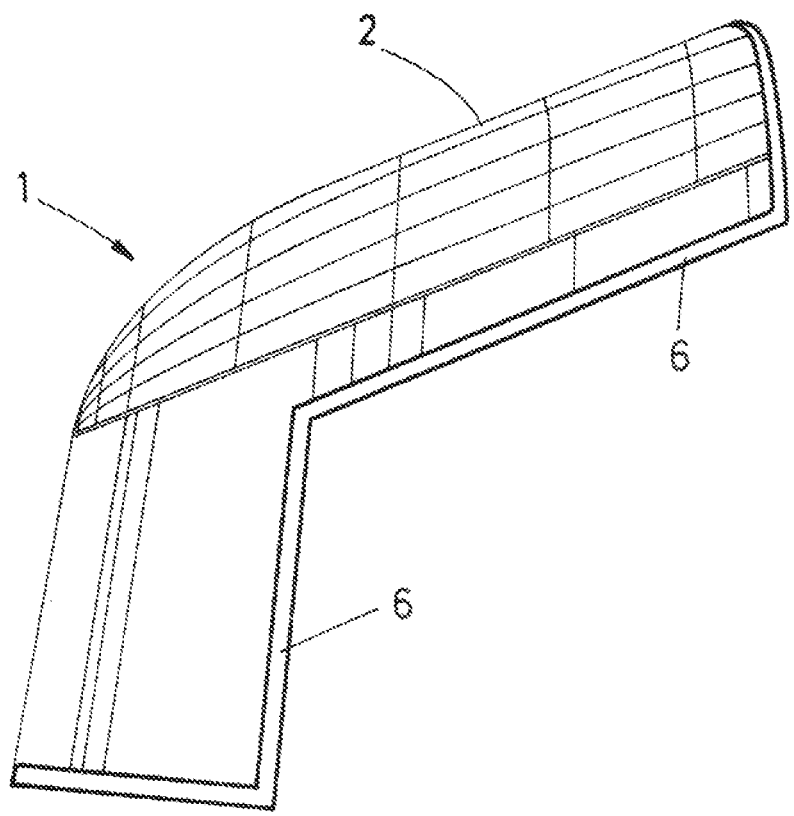
FIG. 4 shows in top plan view a preferred embodiment of a tip structure according to the invention, including a continuous plies reinforcements at the attachment areas.

In the embodiment of FIG. 4, the tip structure (1) includes a local reinforcement (6) that consists of a continuous ply or a laminate of continuous plies of carbon fiber composite material, which is applied during the manufacturing process at critical areas like attachment areas. In the embodiment of FIG. 4, this local reinforcement (6) extends along the entire free edge of the tip shell (2).

In order to fulfil the lightning strike requirement, the tip structure includes a metallic material applied on the outer surface of the tip shell, wherein the metallic material is suitable to provide electrical conductivity in the event of a lighting strike. Additionally, this metallic material provides anti-erosion capability to the erosion prone areas of the tip shell and a first ductile barrier for low energy impacts.

The two following manufacturing process are preferred to obtain the metallic material:

In the preferred embodiment of FIG. 6, a bronze mesh or expanded copper foil (ECF) sheet (6) is placed on an internal surface of a female mould part (7) (drawing 6A), and then a male mould part (8) is applied against the female part, in such a manner that a gap is defined between mould parts (7,8) with the desired shape for the tip shell. At a subsequent step (drawing 6C) with the mould is closed, a thermoplastic material (9) having short fibres randomly dispersed therein, is injected into the mould (7,8), so that the molten thermoplastic is applied on the metallic mesh or on the ECF (6). As shown in drawing 6E, at a final step the mould is open and a tip shell (2) with an integrated bronze mesh or ECF (6) is obtained.

Alternatively, in the process of FIG. 7, a tip shell (2) is obtained by a similar injection molding process as the one described in connection with FIG. 6, but the metallic material is obtained by a metallization process (10) on the outer face of the thermoplastic injected part after a typical injection process. This thin metal layer deposition process can be carried out by means of different techniques: electrolytic deposition, chemical deposition, vacuum metallization, or thermal projection, so that a thin layer of metal (11) is obtained on the tip outer surface (drawing 7D).

Preferably, the thermoplastic composite material comprises Polyaryl Ether Ketone (PAEK), Polyether Ether Ketone (PEEK), Polyetherketone Ketone (PEKK), or Polyphenylene Sulfide (PPS), and comprises up to about 60% of weight of carbon fibers or glass fibers.

Aspect of the invention may be applied for the manufacture of both tips of an HTP as shown in drawing 1A, as well as for the manufacture of tips for wing, VTP, ailerons, flaps, elevator, rudder, etc, as indicated in FIG. 2.

Other preferred embodiments of the present invention are described in the appended dependent claims and the multiple combinations of those claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft thermoplastic molded injected tip structure, wherein the tip structure is a thermoplastic unitary body comprising an interface area configured to be attached to a torsion box, and conductive material suitable to withstand a lighting strike event, wherein the tip structure is formed by two or more parts, each part obtained by an injection process, with an additional melt-stage to attach the parts to each other, and wherein the tip structure comprises a tip shell made of a first material and at least one local reinforcement made of a second material in the form of a ply of continuous carbon fiber composite material along an entire free edge of the tip shell, wherein the first material is different from the second material.

2. The thermoplastic molded injected tip structure for an aircraft according to claim 1, wherein the thermoplastic composite material is a reinforced thermoplastic material comprising fibers dispersed therein.

3. The tip structure according to claim 1, wherein the conductive material is either a metallic material or a doped resin material located on the outer surface of the tip shell suitable to withstand a lighting strike.

4. The tip structure according to claim 1, wherein the tip structure further comprises a reinforcing structure internally fitted inside the tip shell to reinforce the same, wherein reinforcing structure has been obtained during the same injection molding process together with the tip shell using the same material.

5. The tip structure according to claim 4, wherein the reinforcing structure comprises ribs and/or spars and/or stringers.

6. The tip structure according to claim 1, wherein the thermoplastic composite material is a reinforced thermoplastic material comprising fibers dispersed therein,
wherein the conductive material is either a metallic material or a doped resin material located on the outer surface of the tip shell suitable to withstand a lighting strike,
wherein the tip structure further comprises a reinforcing structure internally fitted inside the tip shell to reinforce the same, wherein reinforcing structure has been obtained during the same injection molding process together with the tip shell using the same material, and
wherein reinforcing structure is configured as an isogrid pattern.

7. The tip structure according to claim 6, wherein the metallic material has been integrally formed with the tip shell by injecting the thermoplastic material on a metallic material inside a mold.

8. The tip structure according to claim 1, wherein the thermoplastic composite material is a reinforced thermoplastic material comprising fibers dispersed therein,
wherein the conductive material is either a metallic material or a doped resin material located on the outer surface of the tip shell suitable to withstand a lighting strike,
wherein the tip structure further comprises a reinforcing structure internally fitted inside the tip shell to reinforce the same, wherein reinforcing structure has been obtained during the same injection molding process together with the tip shell using the same material,
wherein reinforcing structure comprises ribs and/or spars and/or stringers,
wherein reinforcing structure is configured as an isogrid pattern,
wherein the metallic material has been integrally formed with the tip shell by injecting the thermoplastic material on a metallic material inside a mold, and
wherein the metallic material has been integrally formed with the tip shell by a metal deposition technique on the outer surface of a molded tip shell.

9. The tip structure according to claim 1, wherein the thermoplastic composite material comprises Polyaryl Ether Ketone (PAEK), Polyether Ether Ketone (PEEK), Polyether Ketone Ketone (PEKK), or Polyphenylene Sulfide (PPS).

10. The tip structure according to claim 1, wherein the thermoplastic composite material comprises up to 60% in weight of carbon fibers or glass fibers.

* * * * *